Jan. 27, 1953    J. R. ROGERS    2,627,057
RANGE FOLLOW-UP
Filed Aug. 2, 1945
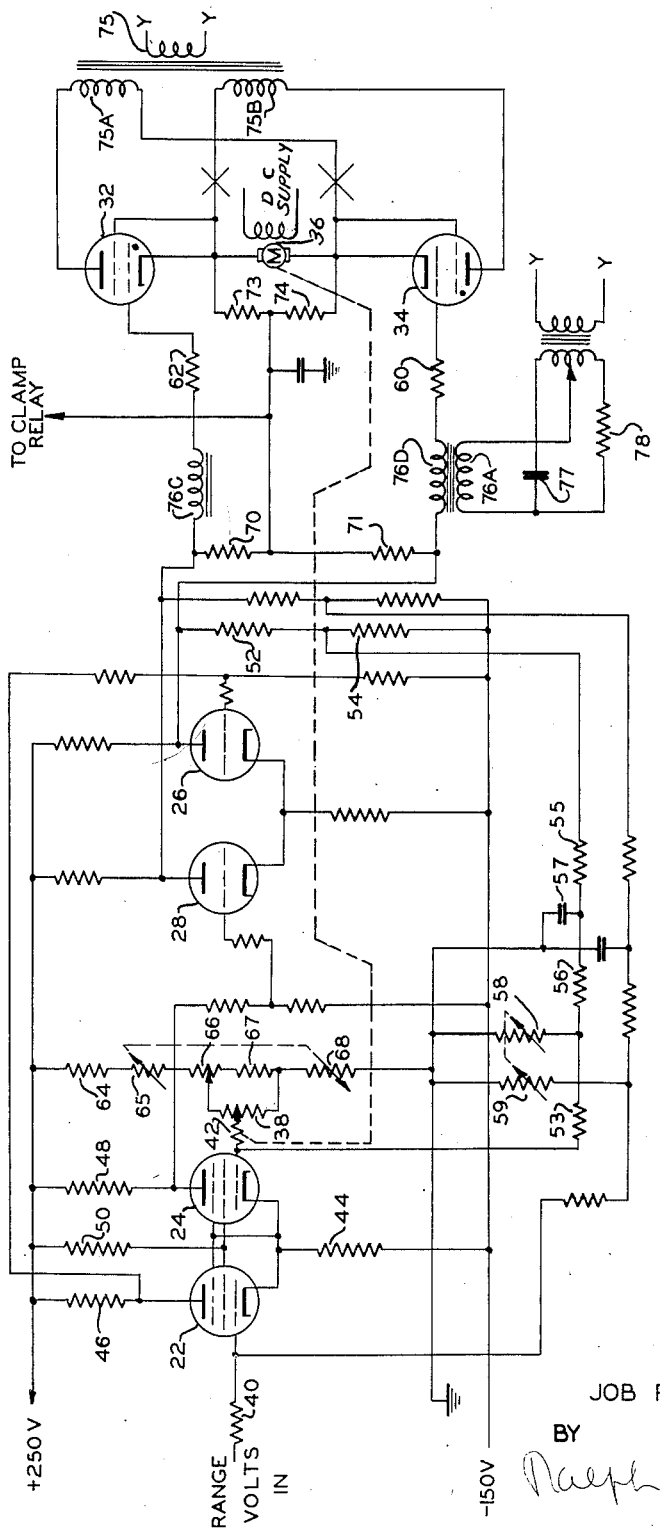
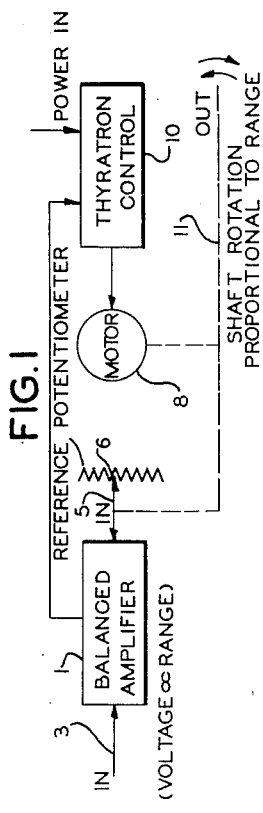
INVENTOR
JOB ROBERT ROGERS
BY
Ralph C. Chappell
ATTORNEY Patented Jan. 27, 1953

2,627,057

UNITED STATES PATENT OFFICE 2,627,057

RANGE FOLLOW-UP

Job Robert Rogers, Cambridge, Mass., assignor, by mesne assignments, to the United States of America as represented by the Secretary of the Navy Application August 2, 1945, Serial No. 608,594

7 Claims. (Cl. 318—28)

This invention relates in particular to a range follow-up system for converting a target range proportional output voltage of a range unit in a radio echo detection system into a shaft rotation which is also proportional to the range of the target or is related to the target range by a desired mathematical function, e. g. a rotation proportional to the logarithm of the target range. Such range related rotation may then be used for driving computers requiring a mechanical input or may be used to operate a mechanical range indicator. In general however the input voltage need not be originated in any particular source since by this device a mechanical shaft rotation may be produced, the amount of which will be directly proportional or functionally related to a varying input voltage from whatever source.

It is therefore the principal object of this invention to provide an electrical system which will convert a varying input voltage into a varying mechanical output directly proportional to such input voltage, or related by some particular function to that voltage.

It is another object to provide a device which will produce a shaft rotation corresponding to and directly proportional or functionally related to a given varying voltage.

Another object is to provide a system which will accurately convert an input voltage received from a range unit of a radio echo detection equipment which voltage is directly proportional to the range of a selected target into a mechanical shaft rotation which will be directly proportional or functionally related to said range.

Other objects, features and uses of the invention will be found from the following detailed description and the drawings illustrating the same.

Fig. 1 is a simple block diagram showing the connections of principal components of the system and illustrating the manner of operation.

Fig. 2 is an electrical circuit diagram of the system.

Shown in the block diagram Fig. 1 is the general operation of the system consisting of a two stage balanced D. C. amplifier 1 whose input is the difference between the range proportional voltage indicated in Fig. 1 as 3 and a reference voltage indicated as 5 obtained from a potentiometer 6 which is rotated by a motor 8. The amplified error signal is applied to the grids of two thyratron power control tubes indicated in Fig. 1 by 10, each of which tubes controls one direction of the motor. The reference potentiometer is suitably geared to the motor which runs in a direction so as to reduce the input differential to amplifier 1. If the potentiometer 6 is linear the angular position will be directly proportional to the range voltage 3.

If, however, the reference potentiometer 6 is of non-linear design the angular position will be related to the input range voltage 3 by a mathematical function depending on the characteristics of the potentiometer 6. Alternatively a functionally proportional shaft rotation instead of a directly proportional rotation may be obtained by use of non-circular gears in the motor driven gear chain to a linear potentiometer. Similarly a non-linear mechanical output may be derived by feeding the linear mechanical output of this system through a mechanical cam converter unit (not shown).

Damping control is obtained by a low pass inverse feedback network which gives the amplifier 1 a gain characteristic rising with frequency. This is equivalent to a derivative circuit in the D. C. input and also minimizes changes in the amplifier gain with supply voltages and tube changes. Further damping is obtained by feedback in the thyratron motor control circuit 10. The gain of the amplifier 1 is adjusted by an attenuator in the inverse feedback network.

When used in connection with an automatic range unit of a radio detection system a provision is made in the invention for disconnecting this system except when a signal is being tracked, utilizing, therefore, a voltage from the automatic range unit to cause the thyratron tubes of the thyratron control circuit 10 to become inoperative.

The desired mechanical output proportional to range (or proportional to input voltage) is obtained from an intermediate shaft indicated in Fig. 1 as 11 of the gear train from motor 8 to potentiometer 6. Limit switches may be provided to restrict the potentiometer 6 from traveling too far in either direction, having each switch remove power from one thyratron leaving the other free to reverse the rotation when the error signal reverses.

Circuit details are given in Fig. 2, showing a servo amplifier consisting of two stages of a differential amplifier each having two tubes, 22 and 24; and 26 and 28 respectively followed by two thyratrons 32 and 34 which control the direction of rotation of a motor 36. The servo amplifier compares the voltage from a reference potentiometer 38 in the motor unit, with a range proportional voltage output of a range unit in a radio echo detection system in such a manner as to cause the motor to turn in such direction as to decrease voltage difference between these two voltages.

The range voltage is fed through a limiting resistor 40, to the grid of tube 22. Reference voltage from the potentiometer 38 is fed through a limiting resistor 42, to the grid of tube 24. The circuits of tubes 22 and 24 constitute the first stage of the differential amplifier. Their cathodes are coupled together and a common bias resistor 44 is connected to a minus 150 volt line. The plates of tubes 22 and 24 receive their supply from a 250 volt line through plate load resistors 46 and 48 respectively. Assume that the range voltage is greater than the reference voltage. This will cause tube 22 to conduct more heavily, lowering the potential on its plate. In turn this increases the bias developed across resistor 44 which serves to increase the plate potential on tube 24. Thus the plate voltage of 24 rises, as fast as the plate voltage of tube 22 drops, hence the term, differential amplifier. The screen grids receive their supply voltage through a resistor 50 from the 250 volt line. The output from the plate of tube 22 is fed through a voltage divider to the grid of tube 26, and the output from the plate of tube 24 is fed through a similar divider to the grid of 28. This puts the grids of tubes 26 and 28 nearer ground potential and permits higher plate voltage swings on these triodes which constitute the second stage of the differential amplifier, which operates in the same manner as the first stage of the differential amplifier. The gain or degeneration control for the amplifier employs a degenerative feedback network. The signal from the junction of resistors 52, 54 (which form a voltage divider on the output of 26) is fed through resistors 55, 56, 53 to the grid of 24. The junction of resistors 55 and 56 is by-passed to common ground by capacitor 57. The filter composed of capacitor 57 and resistors 55, 56 prevents negative feedback for A. C. raising the gain of the amplifier for A. C. and thus providing some anti-hunt control. Across the output of this filter is a resistor 58, a variable resistor which varies the amount of feedback and so controls the D. C. or positioning gain. A similar network is used to furnish the degenerative feedback to the grid of 22. Resistor 59 furnishes the feedback control in this case. The entire amplifier, it will be noted, is symmetrical which allows the mechanical ganging of resistors 58 and 59.

The output of the plate of 26 is fed through the secondary 76D of a transformer later to be described and through a current limiting resistor 60 to the grid of a thyratron 34. The output of the plate of 28 is fed through a secondary winding 76C and a current limiting resistor 62 to the grid of another thyratron 32. The system also applies proper D. C. voltage across the reference potentiometer 38, geared to the servomotor 36. This is accomplished by means of a divider network connected between the plus 250 volt line and common ground, and comprised of resistors 64, 65, 66, 67 and 68. The voltage applied to the potentiometer is taken from resistances 66 and 67. Resistors 65 and 68 are ganged together to set the zero point or zero reference voltage applied to the reference potentiometer.

Resistors 70 and 71 are the grid resistors for the thyratron tubes 32 and 34. The junction between them is connected to the center tap of two resistors 73 and 74 across the motor 36. Half of any difference in potential between the plate of tube 26 and that of tube 28 then appears across resistor 73 and half across resistor 74. Such a drop is the result of a difference in voltage between the range voltage and the arm of the motor driven potentiometer after amplification, and constitutes the error signal to the thyratron motor control circuit.

A transformer with secondary windings 75A and 75B supplies A. C. to the thyratron tubes, with one 210 volt A. C. secondary being connected between the plate of each thyratron and the cathode of the other thyratron. Since the motor is connected between the cathodes, current can then flow in either direction through the armature of the motor depending on which thyratron is made conducting. The motor field is excited from a 28 v. D. C. bus; therefore the direction of current flow in the armature determines the direction of rotation of the motor. If neither tube conducts, or if both conduct equally, the motor stands still. Current can flow through the thyratron only during the half cycle that the plate is positive; hence, the power to the motor will be essentially half-wave rectified A. C.

A small A. C. voltage, lagging the phase of that supplied to the respective thyratron plates by 130 degrees to 150 degrees, is supplied to the respective thyratron grids by transformer windings 76C and 76D whose primary 76A is supplied through a resistor-condenser phase shifter 77 and 78 from an A. C. source in phase with the supply to the thyratron plate supply transformer 75. Such an out of phase voltage may otherwise be provided for thyratron grids by connecting each grid through a resistance and capacitance in series to the plate of the opposite thyratron.

The operation of the thyratron motor control circuit is as follows: While the range unit is searching in the absence of a signal, the junction between resistors 73 and 74 is connected to plus 250 volts by a clamping relay (not shown) in an associated range unit. This raises the cathode of thyratrons 32 and 34 to a potential enough higher than either of their grids to prevent either tube conducting. The grids are connected through resistors 60 and 62 and transformer secondaries 76C and 76D respectively, to the respective plates of tubes 26 and 28 which normally run at about plus 150 volts above ground if there is no error signal at the input of the amplifier. If there is an error signal the higher plate of thyratron 32 or thyratron 34 will still be some 20 to 30 volts below the plus 250 volt figure; consequently neither thyratron can conduct.

Alternatively provision may be made for discontinuing the operation of this servo amplifier system during search by an amplifier (not shown) which applies a clamping voltage of +250 v. through a diode (not shown) to the cathodes of the thyratrons 32 and 34. When the associated range unit locks on a target signal the amplifier causes a positive voltage instead of a negative voltage to be applied to the grid of a triode tube (not shown) causing it to conduct, thereby lowering its plate voltage and likewise the plate of the diode connected to it to a point where the diode no longer conducts and so the clamping voltage no longer affects the thyratron firing. The entire motor circuit is then free to "float" at the potential of the plates of the thyratron 32 or 34. Normal bias conditions for thyratrons 32 and 34 can then be re-established. Whether tube 32 will fire will then depend on the net voltage drop from its grid to its cathode. This is the sum of the voltage drop in 70 plus the voltage drop in 73, plus the instantaneous out-of-phase or lagging A. C. bias voltage introduced by the transformer 76, or by other means.

With the motor initially at rest, the only D. C. in the grid circuit of tube 32 is the drop across 70. Assuming that the range voltage is higher than the voltage on the arm of the motor-driven reference potentiometer, the plate of tube 26 will be positive with respect ot that of tube 28 and the grid of tube 34 will become positive with respect to its cathode. Tube 34 will then conduct each time its plate becomes positive and will drive the motor in the direction to raise the reference potentiometer voltage. A high proportion of cathode feedback in the thyratron circuits provides good speed control for changes in the load.

While specific values of operating voltages have been given, it is to be understood that these are not critical values and any other suitable voltage differences may be employed.

What is claimed is:

1. A servo follow-up system comprising, first and second amplifiers, each of said amplifiers comprising a tube having at least an anode, a control grid and a cathode, means for applying an input voltage to the grid-cathode circuit of said first amplifier, a potentiometer, a potential supply source coupled to the input of said potentiometer, means for applying the output of said potentiometer to the grid-cathode circuit of said second amplifier, a thyratron motor-direction control circuit controlled by the differential output of said amplifiers and having relatively large cathode feedback for speed control under varying motor load, and a motor controlled by the output of said thyratron control circuit for adjusting the output of said potentiometer.

2. Apparatus as in claim 1 and including means operative in the absence of an input voltage for rendering said thyratron control circuit inoperative, said last-mentioned means allowing said thyratron circuit operation during the presence of said input voltage.

3. A servo follow-up system for producing a shaft rotation related by a predetermined mathematical function to a direct current input signal of variable magnitude comprising, a point of reference potential, said input signal being positive with respect to said point of reference potential, a source of direct current reference voltage adjustable in magnitude and positive with respect to said point of reference potential, a differential amplifier having a pair of output termnials, means for applying said input signal and said reference voltage to said differential amplifier to obtain an amplified differential output signal across said pair of output terminals, the potentials at said output terminals both being positive with respect to said point of reference potential and of relative magnitudes dependent upon the relative magnitudes of said input signal and said reference voltage, a motor, a motor control circuit responsive to said output signal to cause rotation of said motor, means for controlling the magnitude of said reference voltage in response to the rotation of said motor, the amount of said rotation being dependent upon the difference in the magnitudes of said input signal and said reference voltage and the direction of said rotation being dependent upon which is the larger, said rotation being in a direction to cause a change in the magnitude of said reference voltage in a direction to reduce the difference between said input signal and said reference voltage to zero.

4. A servo follow-up system for producing a shaft rotation related by a predetermined mathematical function to an input direct current signal of variable magnitude comprising, a point of reference potential, said input signal having positive polarity with respect to said point of reference potential, a source of direct current reference voltage adjustable in magnitude and of the same polarity as said input signal, a first direct current differential amplifier having a pair of output terminals, means for applying said input signal and said reference voltage to said first differential amplifier to obtain an amplified differential output signal across said output terminals, the potentials at said output terminals having the same polarity with respect to said reference potential, a second direct current differential amplifier coupled at its inputs to said output terminals for further amplifying said differential output signal, a negative feedback circuit for coupling said amplified differential output signal to the inputs of said first differential amplifier for providing said amplifiers with an amplified output gain characteristic rising with frequency, a motor, a motor control circuit responsive to said amplified differential output signal to cause rotation of said motor, means for controlling the magnitude of said reference voltage in response to the rotation of said motor, the amount of said rotation being dependent upon the initial differential between said input signal and said reference voltage and the direction of rotation being dependent upon which is the larger, said motor rotation being in a direction to cause a change in magnitude of said reference voltage in a direction to reduce the amplified differential output signal to zero.

5. A servo follow-up system for producing a shaft rotation related by a predetermined mathematical function to an input direct current signal of variable magnitude, comprising, a first differential direct current amplifier including first and second electron tubes each having at least an anode, a control grid and a cathode, a point of reference potential, a source of potential having positive and negative terminals relative to said point of reference, first and second anode load resistors returning the anodes of said first and second tubes to the positive terminal of said potential source, a common cathode resistor coupling the cathodes of said first and second tubes to the negative terminal of said potential source, said input signal being positive with respect to said point of reference, means for coupling said input signal to the control grid of said first tube, and means for coupling a direct current reference voltage to the control grid of said second tube, said reference voltage being positive with respect to said point of reference and adjustable in magnitude, said reference voltage coupling means comprising, a voltage divider network connected between the positive terminal of said potential source and said point of reference and including a plurality of serially connected resistors, a reference potentiometer coupled to said voltage divider network, the potentials at the input terminals of said reference potentiometer both being positive with respect to said point of reference and adjustable in magnitude, and a limiting resistor connected between the movable arm of said reference potentiometer and the control grid of said second tube, a second direct current differential amplifier including third and fourth electron tubes each having at least an anode, a control grid and a cathode, a common cathode resistor returning the cathodes of said third and fourth electron tubes to the negative terminal of said potential source, third and fourth anode load resistors respectively coupling the anodes of said third and fourth tubes to the positive terminal of said potential source, a first pair of resistors serially connected between the anode of said first tube and the negative terminal of said potential source, a second pair of resistors serially connected between the anode of said second tube and the negative terminal of said potential source, a resistor connected between the junction of said first pair of resistors and the control grid of said fourth tube, a resistor connected between the junction of said second pair of resistors and the control grid of said third tube, a third pair of resistors serially connected between the anode of said third tube and the negative terminal of said potential source, a fourth pair of resistors serially connected between the anode of said fourth tube and the negative terminal of said potential source, a first low pass inverse feedback network coupled between the junction of said fourth pair of resistors and the control grid of said first tube, a second low pass inverse feedback network coupled between the junction of said third pair of resistors and the control grid of said second tube, a motor, a motor control circuit coupled across the anodes of said third and fourth tubes for controlling the rotation of said motor, said motor being coupled to said reference potentiometer to control the output of said reference potentiometer in accordance with the rotation of said motor, the amount of rotation being dependent upon the difference in the magnitudes of the potentials at the anodes of said third and fourth tubes and the direction of rotation of said motor being dependent upon which of the anodes of said third and fourth tubes is more positive, the direction of rotation being such as to change the magnitude of the reference voltage at the control grid of said second tube in a direction to reduce the difference in potential at the anodes of said third and fourth tubes to zero.

6. Apparatus as in claim 5 wherein said first feedback network comprises third, fourth, fifth and sixth resistors and a capacitor, said third, fourth and fifth resistors being serially connected in that order between the junction of said fourth pair of resistors and the control grid of said first tube, said capacitor being connected between said point of reference and the junction of said third and fourth resistors, said sixth resistor being adjustable and connected between said point of reference and the junction of said fourth and fifth resistors, said second feedback network being identical with said first feedback network and coupled between the junction of said third pair of resistors and the control grid of said second tube.

7. Apparatus for producing a shaft rotation proportional to the magnitude of a fixed polarity variable magnitude direct current input signal comprising, a first differential direct current amplifier including first and second electron tubes each having at least an anode, a cathode and a control grid, a source of potential having positive and negative terminals, a common cathode resistor coupling the cathodes of said first and second tubes to the negative terminal of said potential source, first and second anode resistors respectively coupling the anodes of said first and second tubes to the positive terminal of said potential source, means for coupling said variable direct current signal to the control grid of said first tube, a voltage dividing network, a reference potentiometer coupled to the positive terminal of said potential source through said voltage dividing network, means connecting the movable arm of said reference potentiometer to the control grid of said second tube to provide a reference voltage for comparison with said variable direct current signal, a second differential direct current amplifier including third and fourth electron tubes each having at least an anode, a cathode and a control grid, a common cathode resistor coupling the cathodes of said third and fourth tubes to the negative terminal of said potential source, third and fourth anode resistors respectively coupling the anodes of said third and fourth tubes to the positive terminal of said potential source, similar voltage dividing circuits respectively coupling the anodes of said first and second tubes to the control grids of said third and fourth tubes, a direct current motor, a motor control circuit coupled to the anodes of said third and fourth tubes arranged to cause rotation of said motor by an amount and in a direction dependent on the difference in magnitude of said input signal and said reference voltage, means mechanically coupling said motor to the movable arm of said potentiometer, said motor control circuit being arranged whereby rotation of said motor causes a change in value, in said reference voltage to reduce the difference between said input signal and said reference voltage to zero, and a pair of feedback networks each including a plurality of serially connected resistors, one of said networks being connected between the anode of said third tube and the control grid of said second tube and the other of said networks being connected between the anode of said fourth tube and the control grid of said first tube.

JOB ROBERT ROGERS.

REFERENCES CITED

The following references are of record in the file of this patent:

UNITED STATES PATENTS

| Number | Name | Date |
|---|---|---|
| 2,154,375 | Chambers | Apr. 11, 1939 |
| 2,270,732 | Jones | Jan. 20, 1942 |
| 2,275,317 | Ryder | Mar. 3, 1942 |
| 2,363,473 | Ryder | Nov. 21, 1944 |
| 2,371,590 | Brooke, Jr., et al. | Mar. 13, 1945 |
| 2,399,695 | Satterlee | May 7, 1946 |
| 2,448,564 | Wilkerson | Sept. 7, 1948 |